INVENTORS
Walter G. Kniffin
Clarence A. Mayer, Jr.
BY
Lloyd M. Keighley.
THEIR ATTORNEY Nov. 16, 1965   W. G. KNIFFIN ETAL   3,217,510
APPARATUS FOR MAKING AND EJECTING ICE BLOCKS
Filed May 27, 1963   8 Sheets-Sheet 4
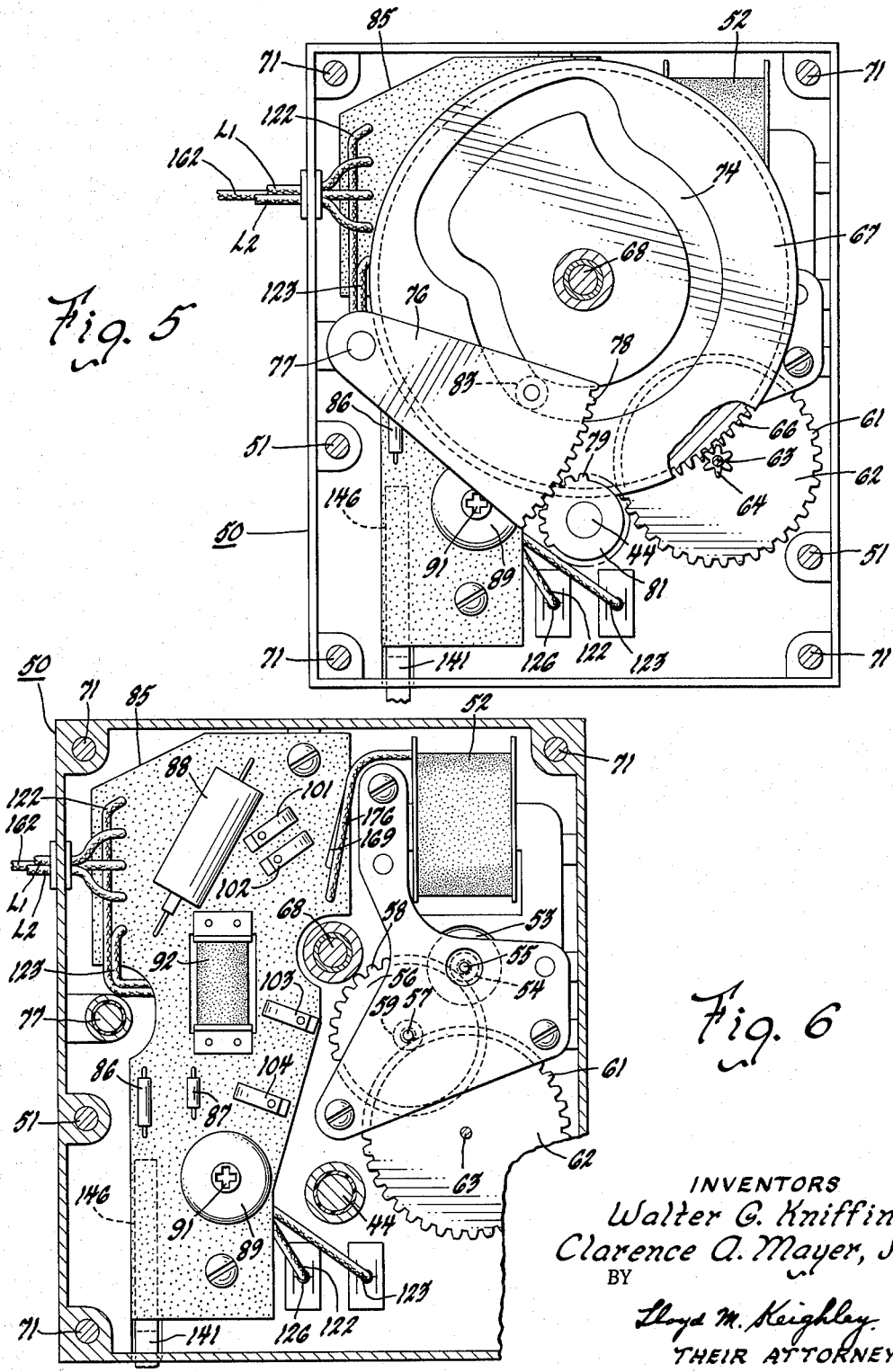
INVENTORS
Walter G. Kniffin
Clarence A. Mayer, Jr.
BY
Lloyd M. Keighley
THEIR ATTORNEY

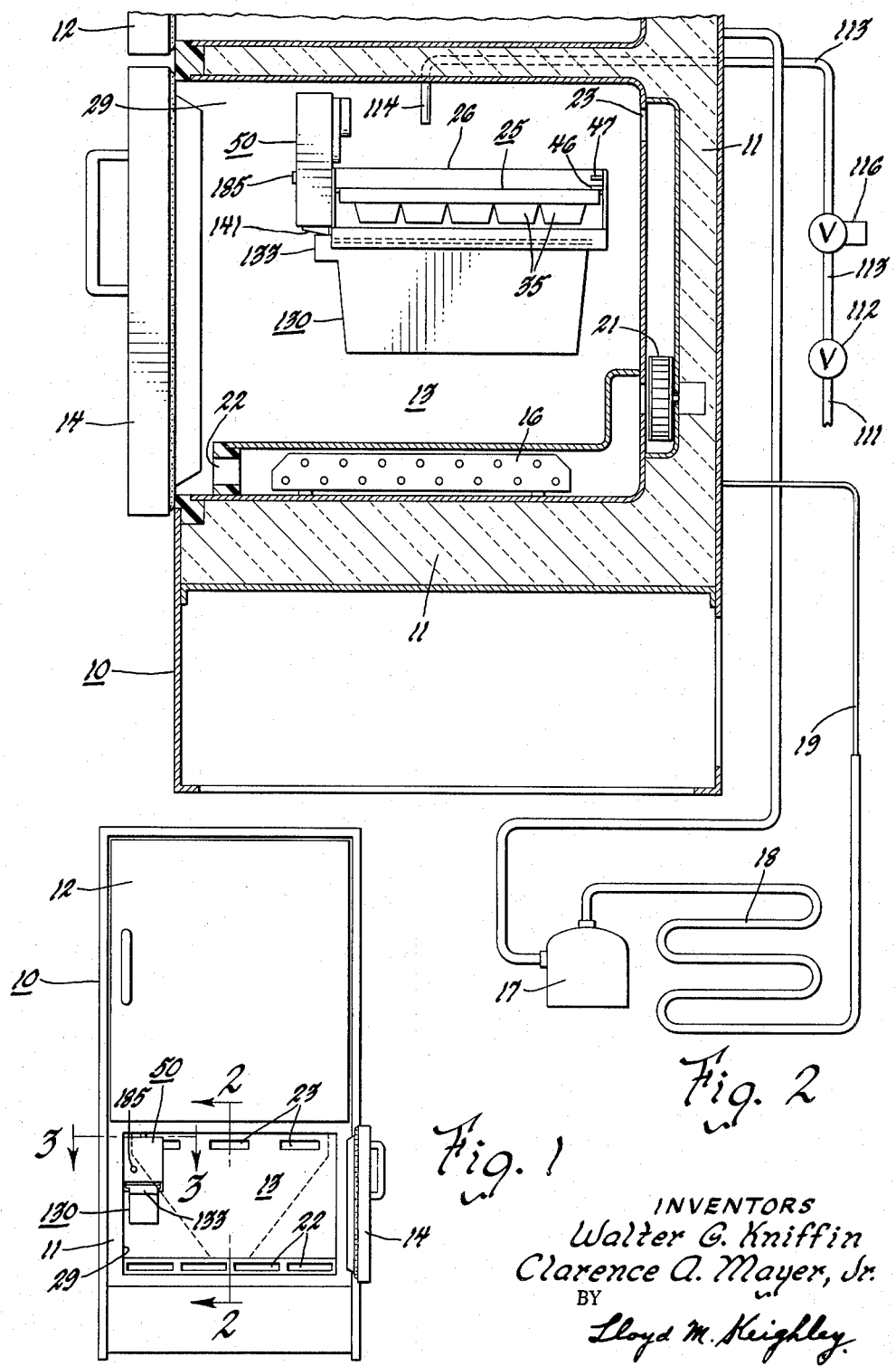

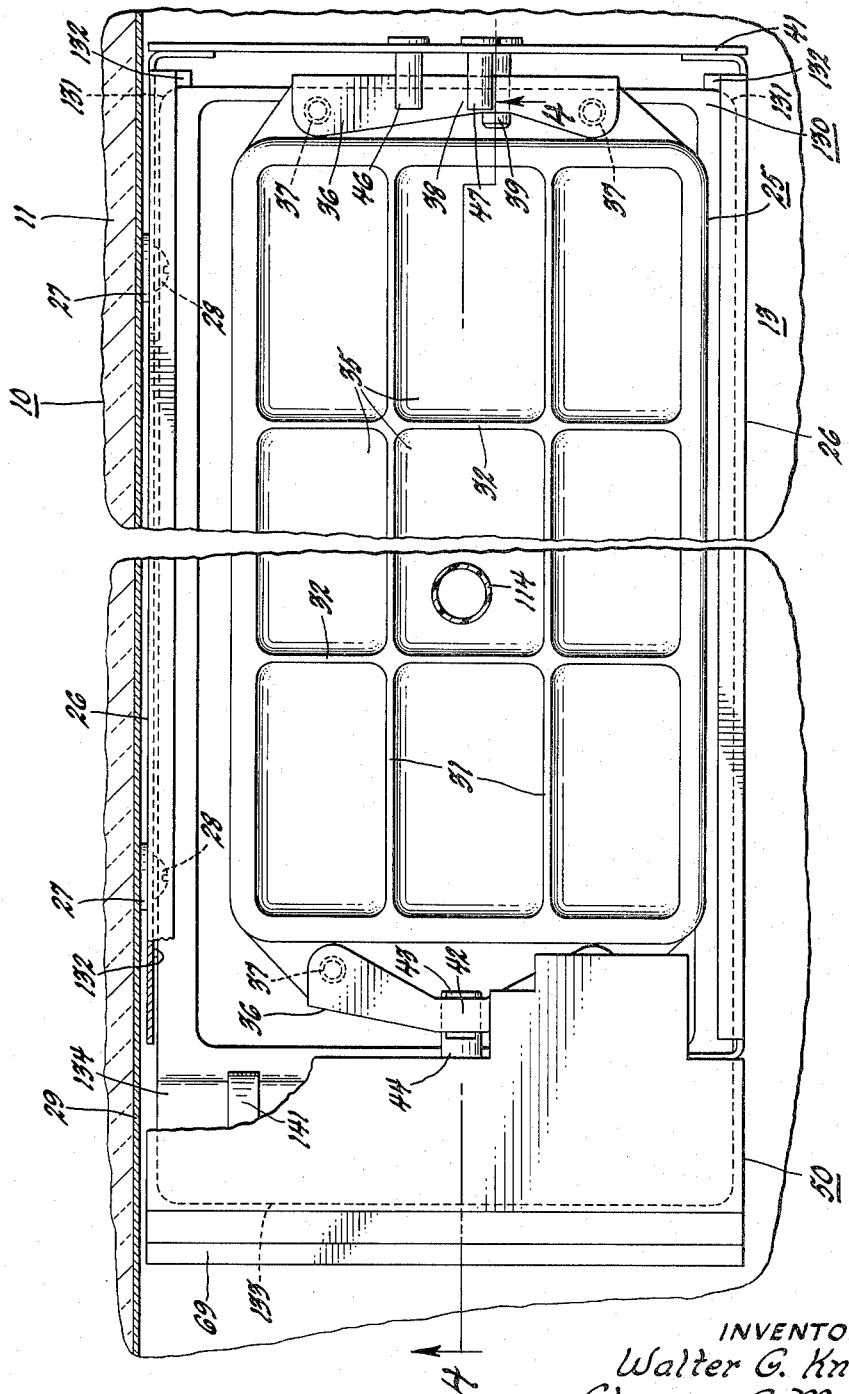

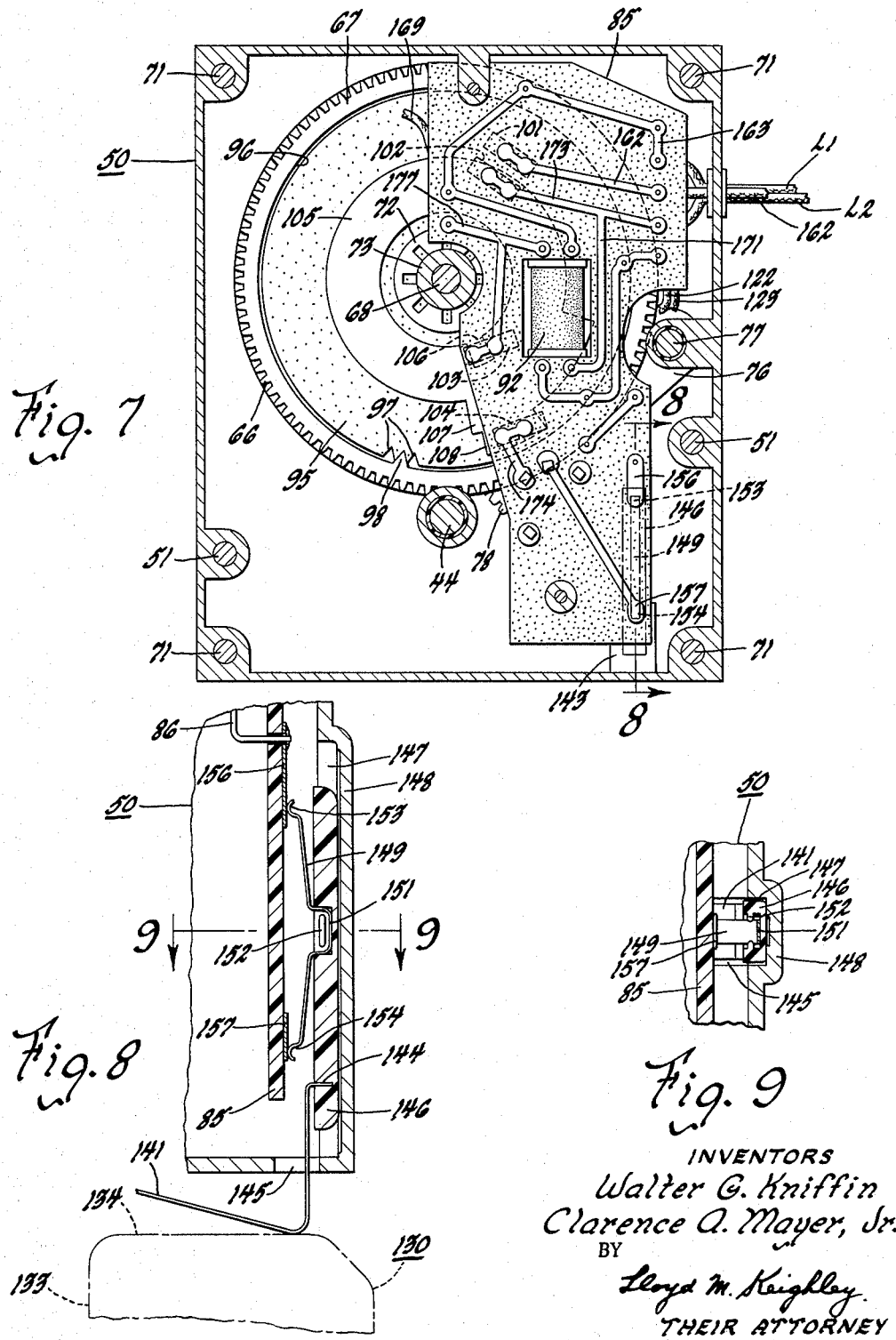

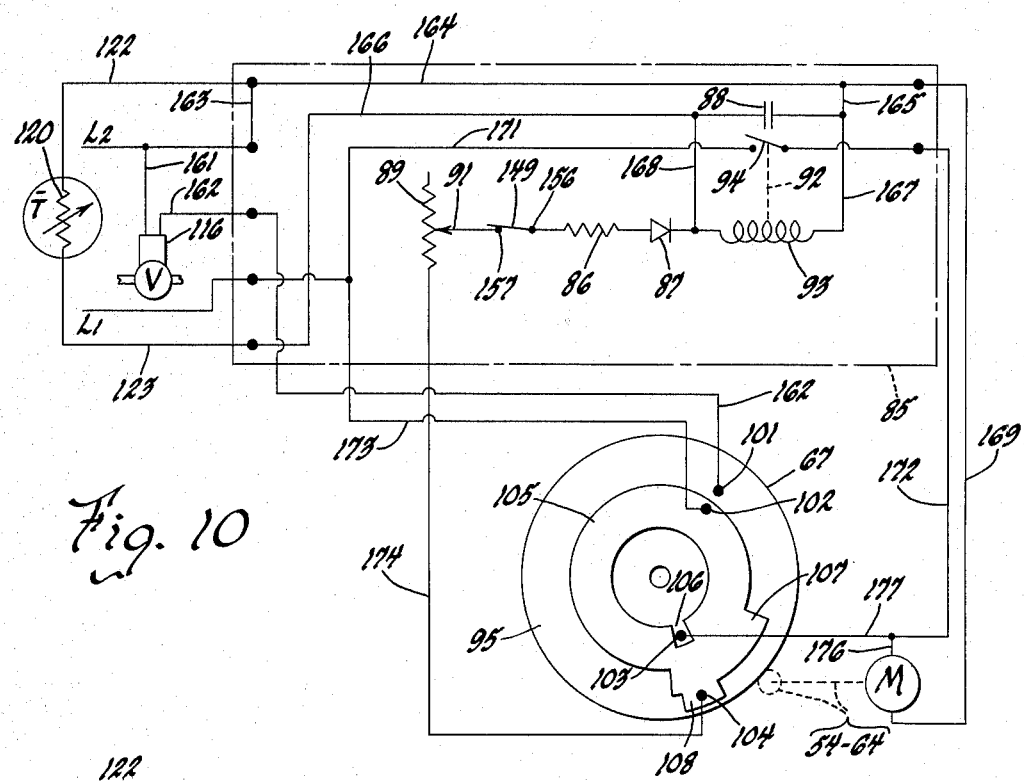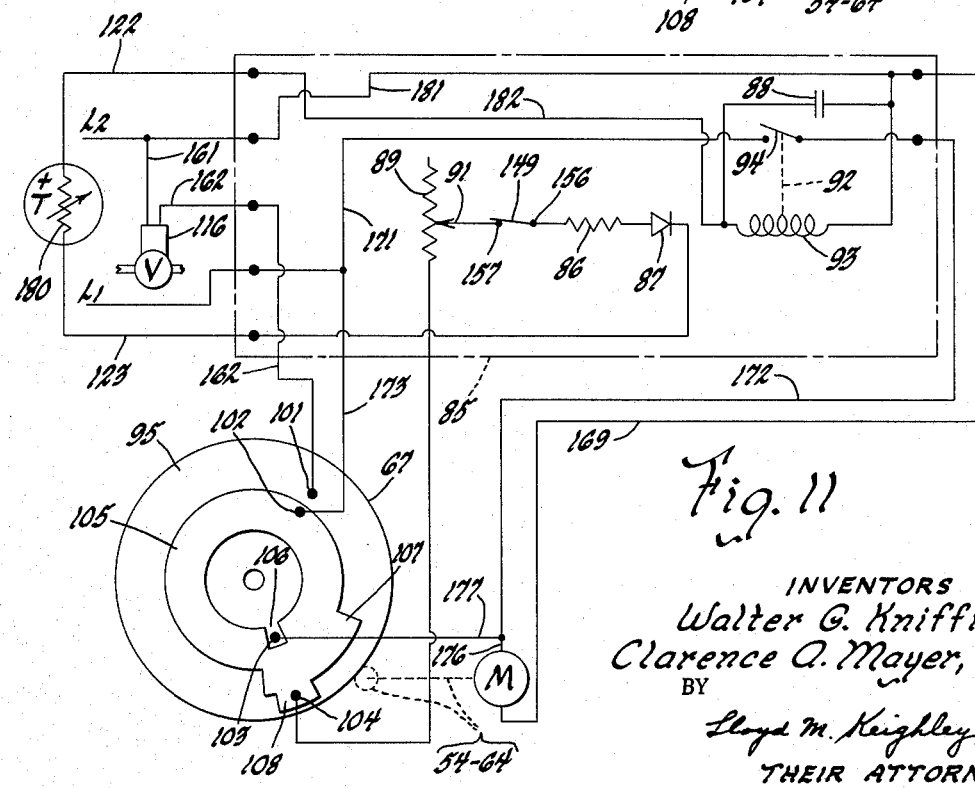

Nov. 16, 1965  W. G. KNIFFIN ETAL  3,217,510
APPARATUS FOR MAKING AND EJECTING ICE BLOCKS
Filed May 27, 1963  8 Sheets-Sheet 7

INVENTORS
Walter G. Kniffin
Clarence A. Mayer, Jr.
BY
Lloyd M. Keighley
THEIR ATTORNEY Nov. 16, 1965   W. G. KNIFFIN ETAL   3,217,510
APPARATUS FOR MAKING AND EJECTING ICE BLOCKS
Filed May 27, 1963   8 Sheets-Sheet 8
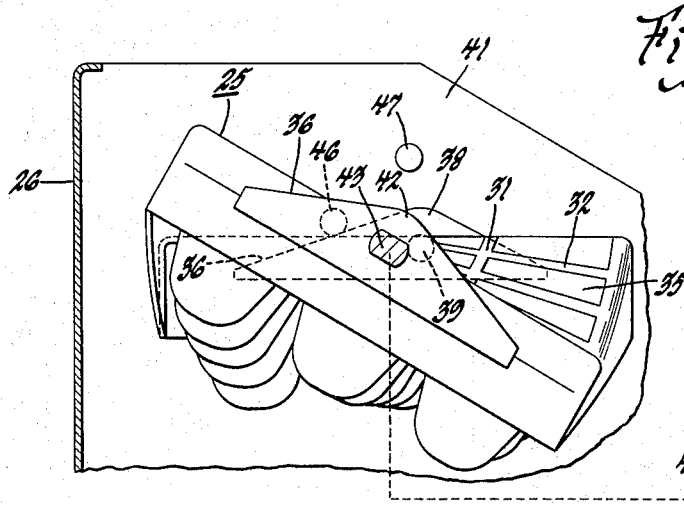
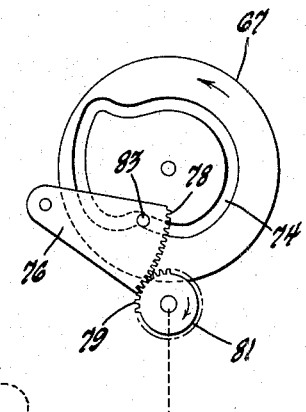
Fig. 14
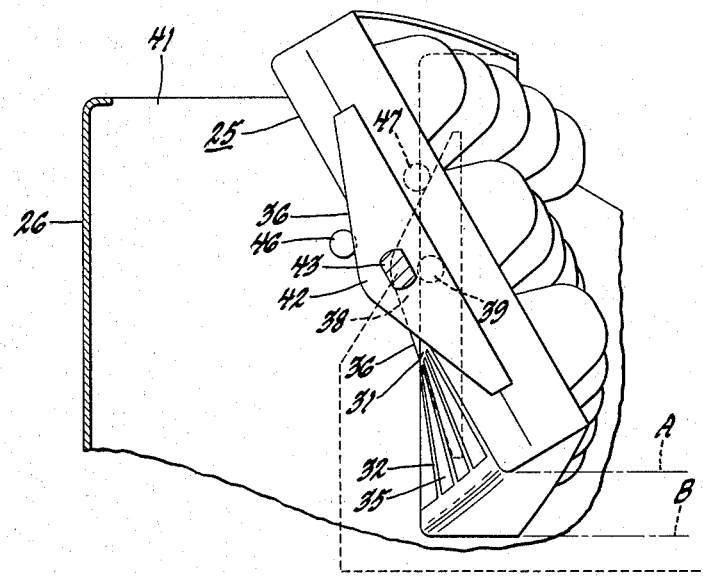
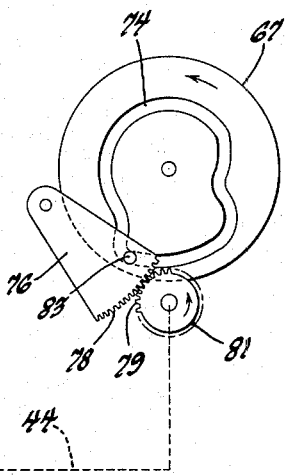
Fig. 15
INVENTORS
Walter G. Kniffin
Clarence A. Mayer, Jr.
BY
Lloyd M. Keighley.
THEIR ATTORNEY

United States Patent Office 3,217,510
Patented Nov. 16, 1965

3,217,510
APPARATUS FOR MAKING AND EJECTING ICE BLOCKS
Walter G. Kniffin and Clarence A. Mayer, Jr., Dayton, Ohio, assignors to General Motors Corporation, Detroit, Mich., a corporation of Delaware
Filed May 27, 1963, Ser. No. 283,165
7 Claims. (Cl. 62—353)

This invention relates to refrigeration and to a machine or apparatus for automatically making ice blocks and ejecting the blocks therefrom in a dry state into a storage receptacle from which they may be harvested.

More particularly, the invention herein has to do with improvements over the ice maker disclosed in the George W. Beck et al. application, Serial No. 232,355 filed October 23, 1962, and assigned to the assignee of the present application. These improvements consist in novel structural arrangements of various elements of the ice maker, their mounting and cooperation with one another and with parts of an electrical system thereof and in means to facilitate servicing of the ice maker after it has been put into operation whereby it will function efficiently and reliably in producing ice blocks. To this end, the improvements all contribute to reducing manufacturing costs so as to provide an ice maker which is practical and justifies a small additional retail price of a household refrigerator cabinet having an automatic ice maker incorporated therein.

An object of our invention is to provide an ice block making apparatus with an electrical system having a control means therein that is preset at a factory and which may be adjusted or reset when the apparatus is installed in a household refrigerator cabinet to meet different conditions or to vary the duration of certain cycles of the apparatus under various temperatures maintained in a freezing chamber of the refrigerator.

Another object of our invention is to provide an ice block maker with an electrical system that includes two separate cooperating printed circuits one of which is stationary and the other of which is mounted on and rotated by a rotating element of the apparatus to complete a series of functions in the operation of the apparatus during cycling thereof.

A further object of our invention is to provide an ice maker with a tray having a plurality of compartments therein adapted to receive water to be frozen into ice blocks that is reversely rotated and reversely twisted which has one of its ends pivotally mounted in offset relation to its other pivotally mounted end with respect to the axis of rotation thereof to move walls of compartments of the tray when it is twisted in a novel fashion to improve liberation of ice blocks from the compartment walls.

A still further and more specific object of our invention is to provide an ice making apparatus with an electrical system which can utilize different types of thermistors and has incorporated in the system a manually adjustable resistor for selectively changing the control by a thermistor therein of an electromagnetic relay in the system to alter cycles of the ice making apparatus.

Further objects and advantages of the present invention will be apparent from the following description, reference being had to the accompanying drawings wherein preferred embodiments of the present invention are clearly shown.

In the drawings:

FIGURE 1 is a front view of a multichambered household refrigerator cabinet showing the door to the freezing chamber thereof in open position to illustrate an ice block making apparatus of our invention mounted therein;

FIGURE 2 is an enlarged vertical sectional view through the freezing chamber portion of the refrigerator cabinet taken on the line 2—2 of FIGURE 1 with a water pipe connected to the cabinet and illustrating a refrigerating system associated therewith;

Figure 4:
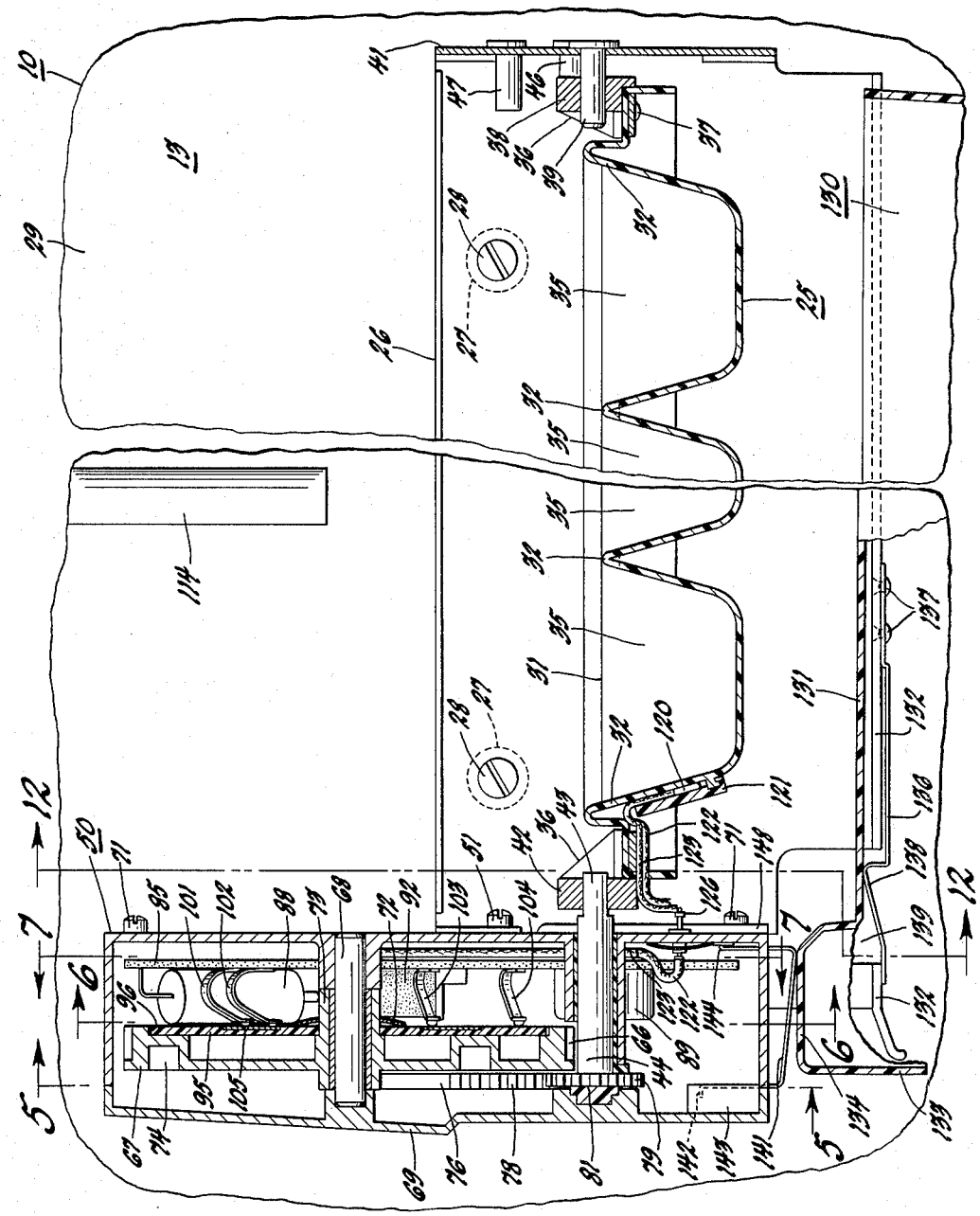
Figure 12:
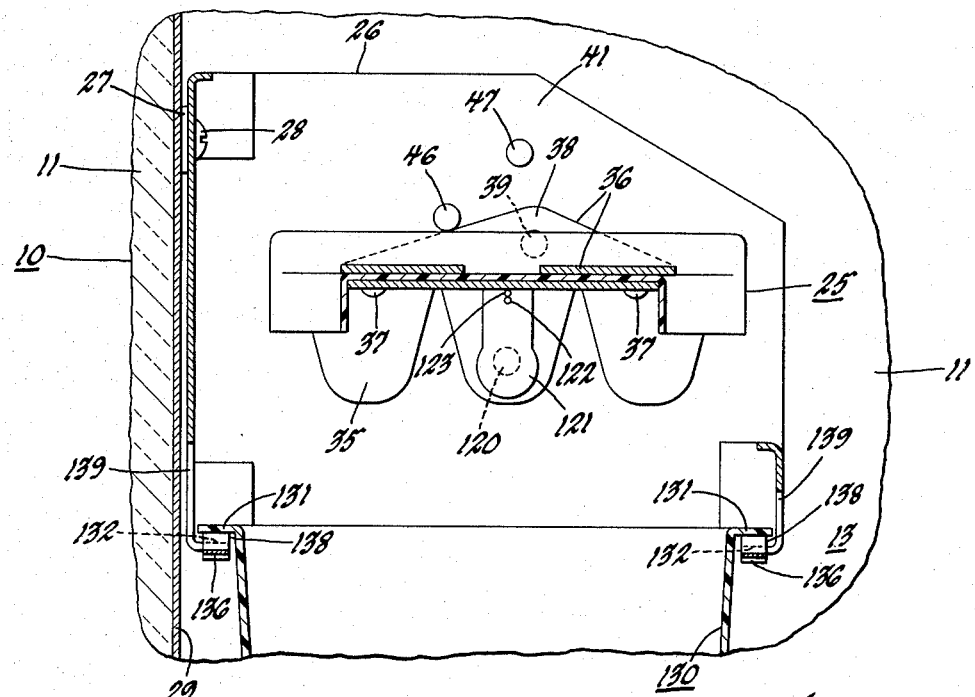
Figure 13:
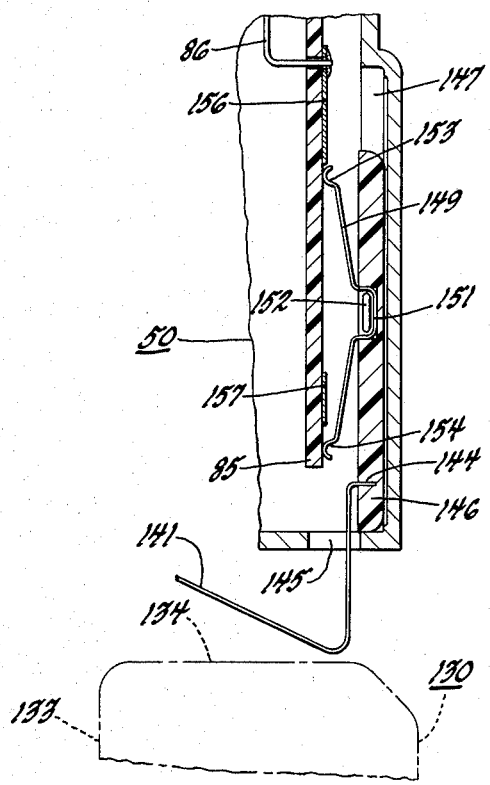

FIGURE 3 is an enlarged horizontal sectional view through the freezing chamber portion of the refrigerator cabinet taken on the line 3—3 of FIGURE 1 showing the top of the ice making apparatus and having a part of a mechanism containing housing thereof broken away to show a portion of an apparatus cut-off switch associated with the front end of an ice block storage receptacle supported below the tray of the apparatus;

FIGURE 4 is a fragmentary broken sectional view of the ice making apparatus taken on the line 4—4 of FIGURE 3 showing the tray thereof associated with a driving mechanism of the apparatus;

FIGURE 5 is a vertical sectional view taken on the line 5—5 of FIGURE 4 through the mechanism housing of the ice making apparatus showing a tray motion converting means therein;

FIGURE 6 is a view similar to FIGURE 5 taken on the line 6—6 of FIGURE 4 showing a stationary printed electric circuit board in the mechanism housing and various electrical elements or devices mounted on one side thereof;

FIGURE 7 is a vertical sectional view taken on the line 7—7 of FIGURE 4 through the mechanism housing showing the stationary printed electric circuit board therein associated with another printed electric circuit board which is rotated by the rotatable tray motion converting means:

FIGURE 8 is an enlarged fragmentary vertical sectional view taken on the line 8—8 of FIGURE 7 showing a slidable apparatus cut-off switch in the mechanism housing having an actuator associated with the front of the ice block storage receptacle;

FIGURE 9 is a fragmentary horizontal sectional view taken on the line 9—9 of FIGURE 8 showing the mounting of the slidable cut-off switch within the mechanism housing;

FIGURE 10 is a diagrammatic view of an electrical system with a schematic showing of printed electric circuit boards therein for the ice making apparatus;

FIGURE 11 is a view similar to FIGURE 10 showing a modified electrical system for the ice making apparatus;

FIGURE 12 is a fragmentary sectional view of the freezing tray and ice block storage receptacle portions of the ice making apparatus taken on the line 12—12 of FIGURE 4 in a direction toward the rear of the tray showing a thermistor mounted thereon;

FIGURE 13 is a view similar to FIGURE 8 showing the ice receptacle moved away from the apparatus cut-off switch actuator with the switch opening a part of the circuit on the stationary insulator board;

FIGURE 14 is a schematic view illustrating an initial rotation and twist of the freezing tray of the ice making apparatus in one direction; and FIGURE 15 is a view similar to FIGURE 14 illustrating rotation and twisting of the freezing tray in another direction.

Referring to the drawings, for illustrating our ice making apparatus, we show in FIGURE 1 thereof the apparatus mounted in a freezing or frozen food storage chamber of a household refrigerator cabinet 10 of the "no frost" or "frost free" type wherein air is circulated from the chamber across an evaporator, chilled to a sub-water freezing temperature and then forced, in a somewhat concentrated stream or streams, back into the chamber over the water congealing device or portion of the ice making apparatus therein. The refrigerator cabinet 10 includes a plurality of insulated walls 11 (see FIGURE 2)

providing an unfrozen food storage chamber in the upper part of the cabinet, closed by door 12, and a freezing or frozen food storage chamber 13 in the lower part of the cabinet normally closed by a door 14, illustrated in open position in FIGURE 1 to show our improved ice maker or ice making apparatus located in chamber 13. Detailed description of the refrigerator and a refrigerating system associated therewith of the character herein shown is unnecessary since such are now in public use and well known to those familiar with the refrigerator art and is preferably of the type disclosed in the L. J. Mann Patent 2,912,834 dated March 27, 1962. This patent is made of reference as exemplifying a more specific or full disclosure of the refrigerating apparatus and control thereof associated with refrigerator 10. The refrigerating system allied with cabinet 10 includes a plate-like refrigerant evaporator not shown, for cooling the upper chamber closed by door 12, a finned tube type refrigerant evaporator 16 mounted between a false bottom of lower chamber 13 (see FIGURE 2) preferably insulated therefrom, a motor-compressor containing casing 17, a refrigerant condenser 18, a refrigerant restrictive capillary tube 19, connected to evaporator 16, and suitable pipes or conduits connecting these elements of the refrigerating system in closed refrigerant flow relationship. Evaporator 16 maintains the interior of chamber 13 at a temperature below 32° F. and preferably between 10° and 15° F. An air moving means in the form of a motor driven fan or blower 21 circulates air out of chamber 13, through inlet openings 22, across or over evaporator 16, to chill the air to a predetermined low temperature, say for example at 5° F., and discharges a stream or streams of this chilled air back into chamber 13 through each of a plurality of outlets 23 over the freezing device portion, tray or mold of the ice maker within this chamber preferably into contact with the surface of water therein.

Ice making apparatus

Our improved ice maker or ice making apparatus located in chamber 13 of cabinet 10 includes an elongated resilient twistable freezing device, tray or mold 25 disposed in an upright horizontal position within the chamber and rotatably supported at its ends for rotation therein on a bracket 26 secured, by spacers 27 and screws 28 (see FIGURES 3 and 4), to a vertical side wall 29 of chamber 13. A tray or mold 25 is provided with a plurality of intersecting longitudinal and transverse upstanding walls 31 and 32, respectively, dividing the interior thereof into rows of closed bottom and open top pockets or compartments 35 of rectangular shape adapted to receive water to be frozen into ice blocks within freezing chamber 13. It is to be noted (see FIGURE 4) that walls 31 and 32 of tray 25 terminate below the top rim on the tray to permit water to overflow these walls during filling of compartments 35 without overflowing the tray rim. The tray 25 may be formed of any suitable material such as spring metal or the like and is preferably formed as an integral unit from polyethylene of such high density as to be self-sustaining and nonsaggable intermediate its ends when the pockets or compartments 35 thereof are substantially filled with water. Ice molds or trays of this general type and configuration are old in the art and are not claimed per se herein. Metal cleats 36 are riveted, as at 37, to opposite ends of tray or mold 25. The cleat 36 at the rotatable rear end of tray 25 is provided with a rounded opening in a boss 38 thereon which loosely fits over a rounded stud or pin 39 secured to one end 41 of bracket 26 (see FIGURES 3, 4 and 6). The cleat 36 at the front or driven end of tray 25 is provided with a partially squared or flattened opening in a boss 42 thereon which loosely fits over a partially squared or flattened part 43 of a drive shaft or stud 44 to be hereinafter described. It is to be understood that the front and rear ends of mold or tray 25 as referred to herein are the ends thereof located closest to door 14 of chamber 13 and the end closest the back wall of this chamber, respectively. It is to be noted (see FIGURE 3) that the axes of boss 38 and pin 39 at the rear end of tray 25 and of boss 42 and shaft 44 at the front end of the tray are located at the same height but the axes of boss 38 and pin 39 are offset laterally from the axes of boss 42 and shaft 44 on approximately the longitudinal center of tray 25 so as to be out of alignment therewith longitudinally of the tray. The offset axes of tray mountings at the front and rear of tray 25 are both intermediate long sides of the elongated tray. This offset axial mounting of tray 25 is a distinctive feature in the present disclosure over the aforesaid application, the purpose of which will be later described. An abutment stud 46 and a stop stud 47 are each rigidly or stationarily secured to the rear end plate 41 of bracket 26 (see FIGURES 3, 4, 12, 14 and 15). The two abutment studs 46 and 47 are arcuately spaced apart about and in the path of opposite rotary movements of tray 25 for engagement by cleat 36 at the rear end thereof to provide stops for effecting reverse twisting of the tray as will be hereinafter described.

A mechanism for rotating tray 25 in a first direction and thence in a second direction wholly within a 360° arc of movement of an element of the mechanism to effect an initial slight twist and at least an equal reverse twist of the tray and an electrical system having portions incorporated in the mechanism for controlling the ice making apparatus and to fill tray 25 with water to be frozen therein is provided in the present ice maker. This mechanism includes or is composed of a mechanical motion transmitting and converting means having one part of a printed electric circuit thereon and rotated therewith and another stationary printed electric circuit part is located in a housing, generally indicated at 50, which is rigidly mounted upon the front open end portion of bracket 26 by screws or the like 51 (see FIGURES 4, 5 and 6). Housing 50 contains a small unidirectional electric motor including a stator 52 and a rotor 53 (see FIGURE 6) having a small gear 54 keyed, in any suitable or conventional manner, to the shaft 55 of rotor 53. A gear 56 rotatably mounted on a shaft 57 has circumferential teeth 58 thereon meshing with the teeth on gear 54 and is provided with a small hub portion having gear teeth 59 cut therein. Teeth 59 on gear 56 mesh with teeth 61 on a gear 62 rotatable about a shaft 63. Gear 62 is provided with a hub portion having teeth 64 cut therein (see FIGURE 5) which mesh with teeth 66 provided on the periphery of a disc-like member 67 rotatably mounted in housing 50 on a shaft 68. One end of shaft 68 is press-fitted into a bearing of housing 50 and the other end of this shaft fits in a bearing formed in a front cover or closure plate 69 (see FIGURE 4) for the housing secured thereto by screws 71. A split spring-like clamping washer 72 (see FIGURES 4 and 7) is pressed onto a hub portion 73 provided on disc-like member 67 to lock a circular insulator printed circuit board thereto and utilized for a purpose to be hereinafter described. All other of the gears are likewise suitably or conventionally journalled in bearings provided in housing 50 and its cover plate 69. The gear train disclosed is similar to that shown in the Beck et al. application hereinbefore identified and is well known or conventional.

In referring to FIGURES 4 and 5 of the drawings, it will be seen that a cam means or continuous cam groove or race 74 is provided around one face of disc-like member 67. A gear segment 76 (see FIGURE 5) is pivotally mounted within housing 50 for swinging movement on a pin or stud 77 and is provided with teeth 78 meshing with teeth 79 provided on a gear 81 formed integrally on the shaft 44 within bearings of housing 50 and cover 69, for rotating the freezing device, mold or tray component 25 of the ice making apparatus (see FIGURES 4 and 5). The gear segment 76 has a cam follower stud or roller 83 secured thereto and this roller is inset into groove or cam race 74 for reciprocating the gear segment and rotating shaft 44 in opposite directions in accordance with curved or lobe portions of the cam race upon rotation of member 67 by the motor rotor 53 through the train of gears disclosed. This cam means and associated elements is also similar to that shown in the aforesaid copending Beck et al. application and they form a motion converting means for changing 360° revolutions of rotor 53 of the unidirectional electric motor into opposite rotary movements of the freezing tray and mold 25 during or in response to a single 360° rotation of cam carrying member 67 whereby a double or reverse twist is caused to be imparted to the tray.

*Apparatus electrical system*

A part of the electrical system or circuit of the ice making apparatus and its control for the stator 52 of the unidirectional motor thereof connected to a source of electric current supply, which may be the wires leading to the motor-compressor containing casing 17 of the refrigerating system associated with the refrigerator 10, includes two separate printed circuits or insulator boards having printed conductive electric circuits thereon to now be described before describing other electrical elements in the system connected to the printed circuits on the boards. Insulator boards having a printed electric circuit thereon or therein are now well known to those skilled in the art and methods of making such need not be herein described. In general, the electric system or circuit of the apparatus includes two portions normally connected to the source of electric current supply and the printed circuit boards contain electrical devices interposed in portions of the circuit. An insulator board 85, stationarily mounted by suitable screws or the like within housing 50, is provided on one side thereof with an electric current conductive printed circuit (see FIGURE 7) and carries or has mounted on its other side (see FIGURE 6) a fixed resistor 86, a diode 87, a capacitor or condenser 88, a manually variable rotatable resistor 89, provided with means or a screw driver adjustment 91 thereon for rotating same and selectively changing its resistance to flow of electric current therethrough, and a relay 92. Relay 92 contains within its body an electromagnetic coil 93 and a switch 94 shown in a wiring diagram to be referred to hereinafter. These electrical devices or elements mounted on the other side of board 85 have conductors or wires extending through the board and connected to parts of the printed circuit on the opposite or one side of the board 85. Another circular insulator board 95 having a printed circuit thereon is mounted in a recessed portion 96 provided on the side of the rotatable disc-like motion converting member 67, opposite the side thereof in which the cam race 74 is formed (see FIGURE 7) for rotation therewith and is associated or cooperates with board 85 (see FIGURE 4). Circular board 95 is provided with side-by-side teeth-like cut out portions 97 in its peripheral edge (see FIGURE 7) one of which may locked in or to a tooth projection 98 provided in the recess 96 of member 67 to give board 95 an adjustable factory setting with respect to the cam race 74 in the rotatable member 67. After meshing one of the teeth 97 on board 95 with the tooth 98 and inserting the board in recess 96 of member 67, the self-clamping circular spring washer 72 is pressed in place on hub portion 73 of member 67 to bite thereinto and lock the board 95 in a fixed position on the rotatable member for rotation therewith as shown in FIGURE 4. Conductor spring-like wiping fingers or brushes 101, 102, 103 and 104, are firmly secured to board 85, preferably at two spaced apart points in any suitable manner (see FIGURES 4, 6 and 7) and connected to parts or paths of the printed circuit thereon. These fingers project from board 85, intermediate the boards 85 and 95, and are biased against board 95 to engage or intermittently contact parts or paths of the printed circuit thereon as the latter board is rotated. The printed circuit on board 95 includes or is comprised of a circular conductor or commutator 105 having a cutout or gap 106 adjacent its inner diameter (see FIGURES 7, 10 and 11), an increased diameter part or path 107 of predetermined length and another increased diameter part or path 108 also of predetermined length but shorter than path 107. Fingers 101, 103 and 104 are arranged on the board 85 in spaced relation to the axis of rotatable board 95 so as to lie in the path of rotation of void or gap 106 in conductor 105 and certain parts or paths 107 and 108 respectively of conductor or commutator 105 and contact them upon rotating member 67. The finger 102 is disposed to at all times engage a continuous circular part of conductor 105. For example, finger 103 is adapted to wipe against the inner diameter part or path of commutator 105 for engaging the void or gap 106 and breaking a certain circuit, finger 102 is adapted to wipe against the continuous part or path of commutator 105 intermediate gap 106 therein and the large diametered part or path 107 thereof, finger 101 is adapted to wipe against the increased diametered part or path 107 and finger 104 is adapted to wipe against the further increased diametered part or path 108 of the commutator (see FIGURES 7 and 10).

*Water supply*

We provide the ice maker with means for automatically filling compartments 35 of tray 25, while it is in an upright position, with water to be frozen into ice blocks within freezing chamber 13. This means includes a pipe 111 (see FIGURE 2) connected to a source of water supply under pressure having a manually actuated shut-off valve 112 therein. Another pipe 113 extends from pipe 111 and valve 112 through an insulated wall of chamber 13 of cabinet 10 and is provided with a non-metallic plastic outlet end portion 114 disposed above tray 25 out of the path of rotation thereof. A solenoid actuated valve 116, included in the electrical system of the apparatus, is interposed in pipe 113 between its outlet end 114 and shut-off valve 112 for periodically admitting water to tray 25. The solenoid valve 116 is coordinated with elements of the electrical system, rotatable commutator 105, of the apparatus so as to open and close this valve in a manner to be hereinafter described.

*Tray rotation control*

Rotation of tray 25 is initiated by a temperature responsive means which is protected or isolated from temperature differentials existing within chamber 13 in the vicinity of the tray so as to be rendered capable of accurately sensing the exact temperature of solidly frozen ice in tray 25. We prefer to employ a thermistor 120 to detect ice frozen solidly in tray 25 and it is sealed in intimate or thermal heat conductive relationship with an upstanding wall 32 of the tray by any suitable or desirable non-metallic clamping means or the like 121 for securing it to a wall of a compartment (see FIGURE 4) so as to be rotatable with the tray. The thermistor 120 is shielded by its clamping means 121 from the very low temperature chilled air circulated into chamber 13 by the blower 21 so as not to be affected thereby. Thermistor 120 has insulated wires 122 and 123 extending therefrom to insulated terminals 124 and 126, respectively (see FIGURES 4, 5 and 6) which pass through the back wall of housing 50 and are secured thereto by conventional self-locking spring clips. A thermistor is a semiconductor of electric current and is extremely sensitive to relatively minute temperature variations. A thermistor may be in the form of a small bead, disc or bar variable resistor controlled by environment temperature changes and comprised of elements immovable with respect to one another. Such a variable resistor may be of two types now available on the market or to the public. One type of thermistor is known as a high negative temperature coefficient of resistance thermistor and the other is of a positive temperature coefficient of resistance type. A negative type thermistor, when subjected to rising temperatures, has its resistance to flow of electric current therethrough decreased with the increase in temperature and, when subjected to lowering temperatures, there is an increase in thermistor resistance. Conversely, a positive type thermistor, when subjected to rising temperatures, has its resistance to flow of electric current therethrough increased with the increase in temperature and, when subjected to lowering temperatures, there is a decrease in thermistor resistance. Such thermistors are conventional and now well known to those skilled in the art and either type thereof can be employed in the electrical system of our ice making apparatus.

Bin cut-off mechanism

It is, of course, desirable to deactivate the electrical system of our ice making apparatus to stop the production of ice blocks after a predetermined accumulation thereof in an ice block storage bin or serving receptacle 130 removably supported below tray 25 within chamber 13 of cabinet 10 (see FIGURES 1, 4 and 12). Bin or receptacle 130 is provided on each side thereof with outwardly directed flanges 131 received on side ledges or supports 132 formed on opposed depending portions of bracket 26. The front end of bin 130 is provided with a handle 133 (see FIGURE 4) having a portion 134 thereof raised above side flanges 131 thereon. The back end of flanges 131 on bin 130 normally rest on the opposed ledges 132. Leaf-like springs 136 are secured at one end thereof to the front portion of each ledge 132 by rivets 137 and are provided with an upwardly bent portion 138 which normally extends through an open or cut-out part 139 of the ledges (see FIGURE 4) to support the front end of bin or receptacle 130 above ledges 132 thereat (see FIGURES 4 and 12). Bin or receptacle 130 is in this manner normally supported in an inclined position on its supports, rear portions of flanges 132 and raised bent parts 138 of springs 136, to hold an apparatus cut-off switch closed. The elevated front supported part of bin 130 causes the raised portion 134 of its handle 131 to engage and bear against a spring 141, which is weaker in spring tension than the springs 136, and has its one end 142 anchored in a recess provided in a boss 143 formed on cover 69 of housing 50 (see FIGURE 4). The other end 144 of spring 141 extends through an opening 145 provided in the bottom wall of housing 50 (see FIGURES 8 and 13) and is secured to a vertically elongated molded plastic member 146 slidably located in a guide recess 147 formed in a boss 148 on housing 50 (see FIGURES 7, 8, 9 and 13). A spring-like bridging apparatus cut-off switch element 149 having a head 151 anchored, in any suitable or desirable manner, to slide member 146 as at 152 to be slid therewith, has vertically spaced ends 153 and 154 biased against stationary insulator board 85. Ends 153 and 154 of switch element 149 normally bridge conductive portions 156 and 157, respectively, of the printed circuit on board 85 (see FIGURES 7, 8, 9, and 10) to keep the electrical system of the ice maker activated. Ends 153 and 154 of spring-like switch element 149 are adapted to be slid downwardly out of contact with conductors 156 and 157 in response to sliding the raised portion 134 of handle 133 on bin 130 outwardly of its supports 132 and/or in response to a predetermined accumulation of ice blocks in receptacle or bin 130 which ice block accumulation compresses springs 136 and permits its front end to move downwardly away from spring 141. Whenever bin 130 is slid outwardly of supports 132 or its front end is moved downwardly relative thereto, under weight of ice blocks received therein, spring 141 automatically slides member 146 downward and consequently ends 153 and 154 of cut-off switch 149 will disengage conductive portions 156 and 157 on insulator board 85. The sliding of ends 153 and 154 of the spring-like switch element 149 out of bridging contact with conductors 156 and 157 (see FIGURE 13) will break and deactivate portions of the electrical system of the ice making apparatus to stop production of ice blocks thereby. When bin or receptacle 130 is again moved into its proper inclined location on supports 132 and springs 136 beneath the ice maker or after a quantity of ice blocks have been removed from the receptacle so that springs 136 will hold it in its inclined position, as shown in FIGURE 4 of the drawings, the raised front part 134 thereof will reshift spring 141 upwardly to bring switch element 149 into bridging contact with terminals 156 and 157 to thereby reenergize the electrical system.

Complete apparatus wiring circuit

In describing the wiring circuit of our ice making apparatus it is to be understood that reference to wires and/or branch wires includes various portions of the complete circuit which may be electrical conductive parts of printed circuits on insulator boards 85 and 95, wires extending from one to another side of these boards to elements or devices mounted thereon and other wires connected to the water valve 116, thermistor 120 and to the power lines. Referring now to the circuit diagram shown in FIGURE 10, wherein the negative temperature coefficient type thermistor 120 is employed in a portion of the electric circuit of the apparatus in parallel relationship with relay 92, all devices or elements of the electrical system of the ice maker within the dot-dash lines are on or carried by the stationary insulator board 85. The wiping fingers or brushes 101, 102, 103 and 104 on board 85 are illustrated outside the dot-dash lines associated with rotatable conductor or commutator 105 on board 95 of member 67 rotated by the unidirectional motor to aid the present description. In this association the electrical system is activated, such as during a water freezing cycle of the ice making apparatus, but the unidirectional motor which initiates an ice block ejecting cycle of the apparatus, is not yet energized since finger 103 is in registration with the void or gap 106 of commutator 105 and relay switch 94 is open. One end of magnetic coil of solenoid water valve 116 is connected by a wire 161 to power line $L_2$ and its other end is connected by a wire 162 to finger 101 on board 95 out of engagement with commutator 105. Power line $L_2$ is connected by wires 163, 164 and 165 through the capacitor or condenser 88, and wire 166 to both wires 122 and 123 leading from thermistor 120 for activating same. This forms one portion or circuit of the electrical system which is connected in parallel with another portion or circuit thereof by branch wires 167 and 168. The one portion or circuit of the electrical system also includes the unidirectional motor M which has a wire connection 169 to wire 164. The other portion or circuit of the electrical system comprises power line $L_1$, leading to normally open switch 94 of relay 92 by wire 171 and wire 172 having branch wires 176 and 177 are connected to the unidirectional motor M and to finger 103 respectively, at void or gap 106 of conductor or commutator 105 on rotatable member 67. This other portion or circuit of the electrical system also comprises wire 173 leading to finger 102 on the continuous circular part of commutator 105 and from the commutator, through finger 104 and wire 174, to manually adjustable resistor 89, through cut-off switch 149, fixed resistor 86, diode 87 to branch wire 168 and through the electromagnetic coil 93 of relay 92 to branch wire 167 back to power line $L_2$ through wires 165, 164, 163. Electromagnetic coil 93 of relay 92 is in series with the one portion of the two portion electrical system and stator 52 of the unidirectional motor M is connected to each of the portions thereof by wire 169 and the normally open switch 94 contained in and actuated by relay 92.

Apparatus operation

Since the electrical system and component elements or device therein of the ice making apparatus is illustrated in FIGURE 10 of the drawings as being connected together during a freezing cycle of the apparatus to produce ice blocks in tray 25 thereof, it is to be assumed that the activated thermistor 120 is ready to sense a solidly frozen condition of the ice blocks and be reduced in temperature. Ice storage bin or serving receptacle 130 is located beneath tray 25 and supported in its proper position, inclined downward from front to rear thereof, on rear parts of ledges 132 and on the upwardly bent portion 138 of springs 136 to maintain cut-off switch 149 closed. At this time flow of electric current through thermistor 120 is greater than the flow thereof through coil 93 of relay 92 and therefore insufficient current flows through electromagnetic coil 93 to cause the relay to close switch 94 contained therein. Thermistor 120 is reduced in temperature to a predetermined low temperature of the frozen ice blocks in tray 25 and will now have its resistance to flow of electric current therethrough, by way of power line $L_2$, wires 163, 122, 164, 165, 167, relay coil 93, diode 87, fixed resistor 86, closed switch 149, adjustable resistor 89, wire 174, finger 104, commutator part 108, commutator 105, finger 102 and wire 173 back to power line $L_1$, increased to a point where sufficient current, due to the design of relay 92, will flow through the relay coil 93 to close switch 94 and energize the unidirectional motor M. The motor is energized from power line $L_1$, wire 171, through switch 94, wire 172, wire 169, and wires 164 and 163 to power line $L_2$. Energization of stator 52 of the unidirectional motor M rotates its rotor 53 and cam member 67, through the train of gears 54, 56, 59, 62 and 64 whereby motion converting cam member 67 is rotated in a counterclockwise direction as viewed in FIGURE 5 or in a clockwise direction as viewed in FIGURES 7 and 10, to cause the cam follower roller 83 to operate gear segment 76 upwardly about its pivot 77 to rotate gear 81 and shaft 44 for rotating the driven front end of tray 25 in a clockwise direction as viewed in FIGURE 14 of the drawings. As rotation of member 67 is initiated void or gap 106 of the printed circuit commutator 105 moves past finger 103 and this finger then makes contact with the inner diameter part or path of commutator or conductor 105 to keep the motor M energized. The motor M remains energized, through wires 169, 164 and wire 163 to power line $L_2$ and from power line $L_1$, wire 173, finger 102, commutator 105, finger 103 and branch wires 177 and 176 until relay switch 94 is again opened in a manner to be presently described. Also, as rotation of member 67 is initiated, the larger diametered part or path 108 of commutator 105 moves past finger 104 to thereby deactivate adjustable resistor 89, fixed resistor 86, diode 87 and relay 92. At this time one side of cleat 36 on the rear end of elongated tray 25 is abutting the abutment stud 46 (see FIGURES 12 and 14) to hold the tray rear end against rotation or stationary while the driven or front end of tray 25 is initially rotated clockwise throughout an arc of approximately 30°. Rotation of the front end of tray 25 clockwise while its rear end is held stationary twists the tray from end to end thereof (see FIGURE 14).

This initial clockwise rotation and twisting of tray 25 peels ice blocks frozen in compartments 35 of the tray loose from walls thereof. Continued rotation of the unidirectional motor M further rotates member 67 in its clockwise direction, as viewed in FIGURES 7 and 9 or in a counterclockwise direction as viewed in FIGURE 15, whereby roller cam follower 83 enters another or greater diameter portion of cam race 74 in member 67 and operates gear segment 76 downwardly about its pivot 77 to reverse the rotation of tray 25 into a counterclockwise rotation thereof. The rear end of tray 25 moves away from abutment stud 46 and this counterclockwise rotation of the tray is throughout an arc of 120°, inclusive of its 30° initial clockwise rotation and a 90° counterclockwise rotation thereof, to rotate same into a vertical or substantially inverted position whereupon the other side of cleat 36 at the rear end of tray 25 engages stop stud 47. The counterclockwise rotation of tray 25 is continued, while its rear end is held stationary against stud 47, by the motor M and member 67, and its front end moves through an additional arc of approximately 30° past this stop stud (see FIGURE 15) to reversely twist the resilient tray for removing warpage imparted thereto by its initial twist. By virtue of the offset arrangement of shafts 39 and 44 tray 25 intermediate ends thereof is moved in a plurality of directions during the counterclockwise rotation and reverse twisting thereof. For example, portions of tray 25 are moved upwardly and laterally of one another whereby its one or driven front end shifts sidewise relative to the now stationarily held other or rear end thereof. Sidewise shifting of the front end of tray 25 with respect to its rear end is depicted in FIGURE 15 of the drawings and is illustrated by the spaced apart dot-dash lines indicated at A and B therein. These plurality of simultaneous movements, resulting from counterclockwise rotation and reverse twisting of tray 25 and particularly the sidewise shifting of ends of the tray are of importance in the present disclosure and form the basis for mounting tray 25 in the offset manner described. The sidewise shifting of ends of tray 25 with respect to each other obtusely distorts the rectangularly shaped ice compartments 35 and shifts straight portions of upstanding opposed end walls 32 of the compartments in the rows thereof relative to one another in a direction transverse of the length of the tray. These simultaneous movements of portions of tray 25 and the sidewise shifting of its ends while the tray is being rotated in a counterclockwise direction, about changing axes intermediate the axis of shaft 39 and shaft 44, forces or practically squeezes the preloosened ice blocks out of their compartments 35 into storage receptacle 130 and is highly effective in assuring that all ice blocks will be ejected from the tray before it is reversely twisted and rotated into its upright position in chamber 13.

During the two twisting actions of tray 25 a certain amount of lengthwise shrinkage or so-called "roping" thereof takes place and the clamping cleats 36 on the tray may slide along the mounting shafts or pins 39 and 44 to permit this "roping" or shrinkage. Further rotation of member 67, in a clockwise direction as viewed in FIGURES 7 and 10, then again reverses the direction of rotation of tray 25 to a clockwise rotation thereof whereupon the tray is rotated back into its normal upright position with its rear end impinged against abutment stud 46. The initial clockwise and the counterclockwise rotations of tray 25 both occur during substantially a 180° clockwise rotation, as viewed in FIGURES 7 and 10, of member 67. During a portion of the other or remaining 180° clockwise rotation of member 67, as viewed in FIGURES 7 and 10, finger 101 engages or contacts the intermediate diametered part or path 107 of commutator 105 and this energizes the magnetic coil of valve 116 to open same and permit flow of a predetermined amount of water into the now uprighted tray 25 through pipes 111, 113 and 114 to ready the apparatus for a water freezing cycle before its unidirectional motor is de-energized. Thus, the motor M continues to rotate member 67 throughout a 360° rotation thereof whereby part or path 107 of commutator 105 thereon rotates past finger 101 onto insulator 95 for de-energizing water valve 116 to stop flow of water into tray 25, to rotate the void or insulated gap 106 of printed circuit commutator 105 into registration with finger 103 for stopping the motor and to rotate part or path 108 into registration with finger 104 for again reactivating the relay portion of the circuit. It is to be understood that since thermistor 120 is activated except when spring bridging switch 149 is shifted out of engagement with contacts or terminals 156 and 157, on board 85, it senses the higher temperature water discharged into tray 25 and the temperature of the incoming water thereto warms the thermistor whereby its resistance to flow of current therethrough decreases and flow of current through the electromagnetic coil 93 is insufficient for operation of switch 94 by relay 92 because of the low resistance of thermistor 120 and switch 94 remains open. Opening of relay switch 94 takes place just after a rotational cycle of member 67 starts at which time brush or finger 104 is disengaged from part or path 108 of commutator 105. In this manner the unidirectional motor M is continued to be energized, from power line $L_1$, wire 173, finger 102, commutator 105, branch wires 177 and 176, wires 169, 164 and 163 to power line $L_2$, until void or gap 106 on the commutator is rotated into registration with finger 103 which then breaks this portion of the circuit to stop the motor M. Substantially at this same time part or path 108 of commutator 105 is rotated into registration with finger 104 to reactivate adjustable resistor 89, fixed resistor 86, diode 87, relay 92 and thermistor 120 for readying the thermistor of apparatus to detect solidly frozen ice blocks and initiate a subsequent ice ejecting cycle thereof. Rotation of tray 25 in its first, second and third directions may be herein only briefly described and a more detailed explanation of the rotations thereof can be had by reference to the Beck et al. copending application heretofore identified.

*Apparatus operation with modified electrical systems*

In FIGURE 11 of the drawings we show a positive type thermistor 180 in an electrical system for our ice making apparatus. This thermistor 180 has a variable resistance which is varied automatically in response to temperature changes thereof so as to be increased with an increase in its temperature and consequently decreased with a decrease in its temperature. The electrical system disclosed in FIGURE 11 is substantially the same as that shown in FIGURE 10 but it should be noted that thermistor 180 is connected in series relationship with the relay which presents a feature over the parallely connected thermistor in the system shown in FIGURE 10 to be hereinafter explained. Thermistor 180 is connected by wires 181 and 182 in series with relay 92 and electric current is normally supplied to this thermistor by way of power line $L_1$, wire 162, finger 102, commutator 105, finger 104, wire 174, manually adjustable resistor 89, closed cut-off switch 149, fixed resistor 86, diode or rectifier 87, wire 123, wires 122 and 182 through relay 92 and back to power line $L_2$ by wire 181. When thermistor 180 senses a solidly frozen condition of ice blocks in tray 25 of the ice maker, its temperature is lowered and its resistance to flow of electric current therethrough is reduced, thus permitting more or a substantial increase in flow of current through relay coil 93 which will cause relay 92 to close its switch 94 and initiate an ice block ejecting cycle of the apparatus. An advantage is derived from employing the positive type thermistor 180 in series relationship with relay 92 and this advantage lies in the fact that should one or both small wires 122 or 123 leading to this thermistor, mounted on the rotatable tray 25 be broken, it will, after completion of a subsequent ice ejecting cycle of the apparatus, open or de-energize the feed current circuit to relay 92 and prevent further operation of the ice making apparatus. For this reason, it can be highly desirable to utilize the characteristics of thermistor 180 in series with a relay as proposed instead of thermistor 120 in parallel relationship with a relay which, if a wire 122 or 123 leading thereto becomes broken, may permit continued malfunction cycles of the ice making apparatus.

*Resistor adjustment*

As hereinbefore mentioned the variable resistor 89 employed in a portion of the circuit of the electrical system of the ice making apparatus is provided with a screw driver adjusting means 91 for rotating a part of resistor 89 relative to another part thereof to change its resistance to flow of electric current therethrough.

Such manually adjustable resistors are similar to rheostats and are conventional and well known to those skilled in the art. Adjusting means 91 of resistor 89 is positioned behind front cover plate 69 of housing 50 and a hole provided in this plate, affording access to the means 91 or resistor 89 with a screw driver, is normally closed by a removable snap-in-place plug 185 (see FIGURES 1 and 2). After the ice making apparatus is installed in a refrigerator cabinet it may be desirable to alter the duration of a cycle of the apparatus and in order to do this the plug 185 is removed, a screw driver is inserted through the hole in cover plate 69 of housing 50 and into manipulating engagement with the adjusting means 91. By rotating means 91 to move a part of resistor 89 with respect to another part thereof positions of elements therein are changed and this adjusts its resistance to flow of electric current therethrough to thereby deviate the temperature control of thermistors 120 and 180 on coil 93 of relay 92. In other words, the thermistors 120 and 180, when resistor 89 is adjusted, cause the switch 94 of relay 92 to close the circuit in the electrical system of the apparatus leading to the unidirectional motor at a temperature of the frozen ice blocks differing from the normal predetermined temperature of response thereto for altering the duration of a cycle of the apparatus. In this fashion coil 93 of relay 92 can be made to close switch 94 for initiating an ejecting cycle of the ice blocks, in advance of or subsequent to the normal response of the thermistors to shorten or lengthen water freezing cycles of the apparatus. This provides a serviceman with a means by which to adjust duration of cycles of the apparatus in accordance with varied temperature conditions prevailing in chamber 13 of refrigerator 10 after installation of the ice maker therein.

It should, from the foregoing, be apparent that we have, in making improvement inventions over the ice maker disclosed in the copending Beck et al. application hereinbefore identified, provided an efficient, low-cost and practical ice making and ejecting apparatus of a small, compact character for installation in a frozen food storage chamber of household refrigerator cabinets. We have provided an ice making apparatus wherein a tray in which ice blocks are frozen in compartments thereof, in addition to being twisted, also moves ends of the tray sidewise relative to each other for shifting walls of the compartments in a multitude of directions to insure removal of the ice blocks from the compartments without employing auxiliary ice block ejecting means. The two printed circuit boards of the electrical system of our apparatus greatly contributes to reducing manufacturing costs of the ice making apparatus in that they take the place of numerous electric switches which are of complicated and expensive construction and require separate wires to be attached thereto and extended therefrom. By mounting one of the printed circuit boards on a motion transmitting and converting means of the apparatus for rotation therewith in cooperation with a stationarily mounted printed circuit board, we provide a new and novel association of printed circuit portions of electrical systems in an ice making apparatus. In our present ice making apparatus a thermistor either of the negative or positive type, as herein described, can be employed, one having advantages over the other to meet certain requirements or desirabilities.

While the embodiments of the present invention as herein disclosed constitute preferred forms, it is to be understood that other forms might be adopted.

What is claimed is as follows:

1. Liquid freezing apparatus comprising in combination:
   (a) a tray disposed in an upright position within a freezing chamber for rotation therein,
   (b) said tray being formed of resilient material and provided with a plurality of integral walls defining a bottom and opposed upstanding walls of open top compartments in the tray adapted to receive liquid to be frozen into frozen blocks, (c) the ends of said tray normally being aligned longitudinally of the tray, (d) one end of the tray being rotatably mounted on an axis centrally of long sides of said tray, (e) the other end of said tray being rotatably mounted intermediate long sides thereof on an axis offset a substantial distance with respect to the axial mounting of said one end of said tray, (f) means connected to said one end of said tray for rotating same about its mounting in different directions, (g) an abutment and a stop separate therefrom each stationarily mounted at arcuately spaced apart points about the axis of rotation of said tray in the path of its said other end, (h) said other end of said tray engaging said abutment in the upright position of the tray to hold it stationary while said rotating means rotates said one end of said tray in a first direction through an arc past said stationarily held other end thereof to twist the tray from end to end for distorting said compartments and loosening frozen blocks from the compartment walls, (i) said rotating means then rotating said tray in a second direction opposite said first direction into a position to remove the loosened frozen blocks from said open top compartments and to rotate said other end of the tray against said stop, (j) said rotating means further rotating said one end of the tray in said second direction past said stop to reversely twist said tray, (k) said stop cooperating with the offset mounting of the tray during reverse twisting thereof to move said one end of said tray relative to its said other end out of longitudinal alignment therewith, and (l) the different movement of ends of said tray shifting said straight portions of the two opposed upstanding compartment walls relative to one another in a direction transverse of the length of the tray whereby preloosened frozen blocks clinging in said compartments after said tray has been rotated in said second opposite direction against said stop are ejected therefrom by being squeezed out of the compartments of the rows thereof.

2. An ice making apparatus comprising in combination:

(a) a tray disposed in an upright position within a freezing chamber for rotation therein, (b) said tray being formed of resilient material and provided with a plurality of integral walls defining a bottom and opposed upstanding walls of rows of open top compartments in the tray adapted to receive water to be frozen into ice blocks, (c) at least two of said opposed upstanding walls of said rows of compartments having straight portions extending transversely across said tray, (d) the ends of said tray normally being aligned longitudinally of the tray, (e) one end of the tray being rotatably mounted on an axis centrally of opposite sides of said tray, (f) the other end of said tray being rotatably mounted intermediate opposite sides thereof on an axis offset laterally from the center of the tray with respect to the axial mounting of said one end of said tray, (g) a unidirectional electric motor for rotating the tray, (h) motion converting means interposed between the motor and said tray connecting said one end of the tray to said motor, (i) said motion converting means changing 360° revolutions of said unidirectional motor into opposite rotary movements of said tray, (j) an abutment and a stop separate therefrom each stationarily mounted at arcuately spaced apart points about the axis of rotation of said tray in the path of its said other end, (k) said motor upon being energized causing said motion converting means to rotate said one end of the tray in a first direction, (l) said other end of said tray engaging said abutment in the upright position of the tray to hold it stationary while said motion converting means rotates said one end of said tray in said first direction through an arc past said stationarily held other end thereof to twist the tray from end to end for distorting said compartments and loosening ice blocks from the compartment walls, (m) said motion converting means then rotating said tray in a second direction into a position to remove the loosened ice blocks from said open top compartments and to rotate said other end of the tray against said stop, (n) said motion converting means further rotating said one end of the tray in said second direction past said stop to reversely twist said tray, (o) said stop cooperating with the offset mounting of the tray during reverse twisting thereof to move said one end of said tray sidewise of its said other end out of longitudinal alignment therewith, and (p) the sidewise movement of ends of said tray shifting said straight portions of the two opposed upstanding compartment walls relative to one another in a direction transverse of the length of the tray whereby preloosened ice blocks clinging in said compartments after said tray has been rotated in said second opposite direction against said stop are ejected therefrom by being squeezed out of the compartments of the rows thereof.

3. An ice making apparatus comprising in combination:

(a) a tray disposed in an upright position within a freezing chamber for rotation therein, (b) said tray being formed of resilient material and provided with a plurality of integral walls defining a bottom, upstanding side and end walls of rows of rectangularly shaped open top compartments in the tray with two opposed side walls of each row of said compartments paralleling the length of said tray and the end walls thereof extending transversely of said tray, (c) said rows of compartments being adapted to receive water to be frozen into ice blocks, (d) the ends of said tray normally being aligned longitudinally of the tray, (e) one end of the tray being rotatably mounted on an axis centrally of opposite sides of said tray, (f) the other end of said tray being rotatably mounted intermediate opposite sides thereof on an axis offset laterally from the center of the tray with respect to the axial mounting of said one end of said tray, (g) means connected to said one end of said tray for rotating same about its mounting in different directions, (h) an abutment and a stop separate therefrom each stationarily mounted at accurately spaced apart points about the axis of rotation of said tray in the path of its said other end, (i) said other end of said tray engaging said abutment in the upright position of the tray to hold it stationary while said rotating means rotates said one end of said tray in a first direction through an arc past said stationarily held other end thereof to twist the tray from end to end for distorting said compartments and loosening ice blocks from the compartment walls, (j) said rotating means then rotating said tray in a second direction opposite said first direction into a position to remove the loosened ice blocks from said open top compartments and to rotate said other end of the tray against said stop, (k) said rotating means further rotating said one end of the tray in said second direction past said stop to reversely twist said tray, (l) said stop cooperating with the offset mounting of the tray during reverse twisting thereof to move said one end of said tray sidewise of its said other end out of longitudinal alignment therewith, and (m) the sidewise movement of ends of said tray shifting said two opposed upstanding ends walls of the rows of rectangular compartments relative to one another in a direction transverse of the length of the tray whereby preloosened ice blocks clinging in said compartments after said tray has been rotated in said second direction against said stop are ejected therefrom by being squeezed out of the compartments.

4. An ice making apparatus comprising in combination:

(a) a tray disposed in an upright position within a freezing chamber for rotation therein, (b) said tray being formed of resilient material and provided with a plurality of integral walls defining a bottom, upstanding side and end walls of rows of rectangularly shaped open top compartments in the tray with two opposed side walls of each row of said compartments paralleling the length of said tray and the end walls thereof extending transversely of said tray, (c) said rows of compartments being adapted to receive water to be frozen into ice blocks, (d) the ends of said tray normally being aligned longitudinally of the tray, (e) one end of the tray being rotatably mounted on an axis centrally of opposite sides of said tray, (f) the other end of said tray being rotatably mounted intermediate opposite sides thereof on an axis offset laterally from the center of the tray with respect to the axial mounting of said one end of said tray, (g) a unidirectional electric motor for rotating the tray, (h) motion converting means interposed between the motor and said tray connecting said one end of the tray to said motor, (i) said motion converting means changing 360° revolutions of said unidirectional motor into opposite rotary movements of said tray, (j) an abutment and a stop separate therefrom each stationarily mounted at arcuately spaced apart points about the axis of rotation of said tray in the path of its said other end, (k) said motor upon being energized causing said motion converting means to rotate said one end of the tray in a first direction, (l) said other end of said tray engaging said abutment in the upright position of the tray to hold it stationary while said motion converting means rotates said one end of said tray in said first direction through an arc past said stationarily held other end thereof to twist the tray from end to end for distorting said compartments and loosening ice blocks from the compartment walls, (m) said motion converting means then rotating said tray in a second direction into a position to remove the loosened ice blocks from said open top compartments and to rotate said other end of the tray against said stop, (n) said motion converting means further rotating said one end of the tray in said second direction past said stop to reversely twist said tray, (o) said stop cooperating with the offset mounting of the tray during reverse twisting thereof to move said one end of said tray sidewise of its said other end out of longitudinal alignment therewith, and (p) the sidewise movement of ends of said tray shifting said two opposed upstanding end walls of the rows of rectangular compartments relative to one another in a direction transverse of the length of the tray whereby preloosened ice blocks clinging in said compartments after said tray has been rotated in said second direction against said stop are ejected therefrom by being squeezed out of the compartments.

5. Liquid freezing apparatus comprising in combination:

(a) a tray rotatably mounted in an upright position within a freezing chamber and provided with walls forming compartments adapted to receive liquid to be frozen into frozen blocks, (b) a unidirectional electric motor for said apparatus, (c) a cam connected to and driven by said motor, cam follower means operably connecting said cam and one end of said tray for rotation of said tray, (d) an electrical system for said apparatus having connections to said motor, (e) control means interposed in said electrical system and responsive to a solidly frozen condition of a frozen block in a compartment of said tray for energizing said motor, (f) said electrical system including two separate printed circuit insulator boards, (g) one of said printed circuit boards being mounted on and rotated with said cam, (h) the other of said printed circuit boards being stationarily mounted and associated with the rotatable board on said cam, and (i) one of said boards having conductor fingers secured thereto connected with parts of said printed circuit thereon and extending therefrom into engagement with said printed circuit on the other board for activating and deactivating portions of said electrical system in response to a 360° rotation of the cam while said motor is energized.

6. Liquid freezing apparatus comprising in combination:

(a) a tray rotatably mounted in an upright position within a freezing chamber and provided with walls forming compartments adapted to receive liquid to be frozen into frozen blocks, (b) a unidirectional electric motor for said apparatus, (c) cam and cam follower means between the motor and said tray connecting one end of the tray to said motor for rotation thereby, (d) an electrical system for said apparatus having connections to said motor, (e) control means interposed in said electrical system and responsive to a solidly frozen condition of a frozen block in a compartment of said tray for energizing said motor, (f) said cam having outwardly and inwardly extending cam surfaces effective upon energizing said motor for changing 360° revolutions thereof into opposite rotary movements of the tray first in one direction during which frozen blocks are loosened from walls of compartments in said tray, then in a second direction during which frozen blocks are ejected out of compartments of the tray and thereafter reversely rotating the tray in said one direction back into its said upright position, (g) said electrical system including two separate printed circuit insulated boards, and (h) one of said circuit boards being on and rotatable with said cam and having conductor connections with the printed circuit on the other of said boards for activating and deactivating portions of said electrical system in response to a 360° rotation of the cam means by said motor.

7. An ice making apparatus comprising in combination:

(a) a resilient walled tray within a freezing chamber,
(b) opposite ends of said tray normally being aligned longitudinally thereof,
(c) one end of the tray being rotatably mounted on an axis intermediate long sides of said tray,
(d) the other end of said tray being rotatably mounted intermediate long sides thereof on an axis offset laterally with respect to the axial mounting of said one end of the tray,
(e) means for rotating said tray about its mounting,
(f) stationary means in the path of and engageable by an end of said tray as same is rotated by said rotating means for holding that end of the tray against rotation while the rotating means rotates the other end of said tray in an arc past said stationary means to twist the tray throughout its length,
(g) said offset mounting of said tray causing during rotation thereof into engagement with said stationary means said opposite ends of the tray to shift sidewise relative to each other out of longitudinal alignment,
(h) the twisting of said tray shrinking same lengthwise thereof, and
(i) both of said opposite ends of the tray being freely movable along their mountings toward one another during the lengthwise shrinkage of said tray.

References Cited by the Examiner
UNITED STATES PATENTS

| | | | |
|---|---|---|---|
| 2,482,820 | 9/1949 | Wolfson et al. | |
| 2,533,616 | 12/1950 | Pace et al. | 62—233 X |
| 2,645,092 | 7/1953 | Ridnour | 62—380 X |
| 2,776,543 | 1/1957 | Ellenberger | 62—157 |
| 2,942,435 | 6/1960 | Nelson | 62—157 X |
| 2,996,895 | 8/1961 | Lippincott | 62—340 X |
| 3,039,278 | 6/1962 | Thompson | 62—156 X |
| 3,056,271 | 10/1962 | De Turk | 62—353 |

ROBERT A. O'LEARY, *Primary Examiner.*